(12) United States Patent
Creasey et al.

(10) Patent No.: US 11,441,000 B2
(45) Date of Patent: Sep. 13, 2022

(54) PLASTIC MODIFYING COMPOSITIONS AND ENHANCED CARBONATE COMPOSITIONS

(71) Applicant: ITI Technologies, Inc., Leland, NC (US)

(72) Inventors: David H. Creasey, Leland, NC (US); Samuel Horace McCall, IV, Leland, NC (US)

(73) Assignee: ITI Technologies, Inc., Leland, NC (US)

( * ) Notice: Subject to any disclaimer, the term of this patent is extended or adjusted under 35 U.S.C. 154(b) by 0 days.

(21) Appl. No.: 16/745,846

(22) Filed: Jan. 17, 2020

(65) Prior Publication Data
US 2020/0325285 A1 Oct. 15, 2020

Related U.S. Application Data

(60) Provisional application No. 62/832,363, filed on Apr. 11, 2019.

(51) Int. Cl.
| | |
|---|---|
| C08J 3/205 | (2006.01) |
| C08L 23/06 | (2006.01) |
| C08L 25/06 | (2006.01) |
| C08L 23/12 | (2006.01) |
| C08K 3/013 | (2018.01) |
| C08K 3/30 | (2006.01) |
| C08K 3/26 | (2006.01) |

(52) U.S. Cl.
CPC .............. *C08J 3/2053* (2013.01); *C08K 3/013* (2018.01); *C08L 23/06* (2013.01); *C08L 23/12* (2013.01); *C08L 25/06* (2013.01); *C08K 3/26* (2013.01); *C08K 2003/265* (2013.01); *C08K 2003/3045* (2013.01); *C08L 2201/54* (2013.01); *Y02P 20/582* (2015.11)

(58) Field of Classification Search
CPC .......... C08J 3/2053; C08K 3/013; C08K 3/26; C08K 2003/3045; C08K 2003/265; C08L 23/06; C08L 25/06; C08L 23/12; C08L 2201/54; Y02P 20/582
See application file for complete search history.

(56) References Cited

U.S. PATENT DOCUMENTS

| | | | | |
|---|---|---|---|---|
| 3,404,951 | A | * | 10/1968 | Tanabe ................. C01G 3/10 423/557 |
| 5,989,595 | A | | 11/1999 | Cummins |
| RE41,109 | E | | 2/2010 | Cummins |
| 7,749,470 | B2 | * | 7/2010 | Fu ......................... C01G 3/00 423/42 |
| 8,012,511 | B1 | | 9/2011 | Cummins |
| 8,691,285 | B2 | | 4/2014 | Cummins |
| 10,264,793 | B2 | | 4/2019 | Meccia |
| 10,662,093 | B2 | | 5/2020 | Nicholas |
| 2010/0233273 | A1 | * | 9/2010 | Burton ................. A61L 15/18 424/489 |
| 2013/0315779 | A1 | * | 11/2013 | Creasey ............... A01N 59/26 424/605 |
| 2014/0171545 | A1 | * | 6/2014 | Creasey ............... C08K 9/02 523/122 |
| 2017/0280728 | A1 | | 10/2017 | Dautreiul | |

* cited by examiner

*Primary Examiner* — Patrick D Niland
(74) *Attorney, Agent, or Firm* — Steven A. Fontana; Nexsen Pruet, PLLC; E. Eric Mills

(57) ABSTRACT

The present invention provides certain aqueous plastic modifying compositions for use in the preparation of plastic forming mixtures used in the preparation and processing of polyethylene, polypropylene and polystyrene plastic products. The aqueous plastic modifying compositions provide certain plastic processing advantages and distinct final plastic product characteristics. The present invention further provides carbonate enhancing composition useful for preparing enhanced carbonate compositions, also of the present invention.

3 Claims, 6 Drawing Sheets

PLASTIC MODIFYING COMPOSITIONS AND ENHANCED CARBONATE COMPOSITIONS

CROSS-REFERENCE TO RELATED APPLICATIONS

The presently disclosed subject matter is related and claims priority to U.S. Provisional Patent Application No. 62/832,363 entitled "Aqueous Plastic Nucleating Composition" filed on Apr. 11, 2019; the entire disclosure of which is incorporated herein by reference.

BACKGROUND

The present invention relates to plastic modifying compositions useful for the manufacture of plastic products that are typically used in injection molding, sheet/film manufacturing and a variety of other intermediate and final plastic products and methods of manufacture. Also provided are enhanced carbonate compositions comprising at least one carbonate and at least one carbonate enhancing composition, also provided for herein, useful for the manufacture/preparation of a variety of materials including, without limitation, rubber, sealants, adhesives, inks, pharmaceuticals, nutritional supplements and other products described herein.

Polypropylene, polyethylene and polystyrene are classes of plastics, formed into plastic products that frequently carry the name of the class of plastic used in the respective formation. Each type of plastic product from these classes of plastic has certain characteristics and traditional and specific uses depending upon the desired attributes of the intended product. More specifically, the type of plastic prepared by the compositions of the present invention are not limited by those recited herein. For example and without limitation, the plastic modifying compositions of the present invention, when used for plastic product preparation, can include the polyolefins including, for example, polyethylene, polypropylene and ethyl vinyl acetate, and polystearate.

Generally, each type of plastic is formed by using a substrate (e.g., polypropylene, polyethylene or polystyrene) and a specific level of fill material (e.g., calcium carbonate, talc, clay material such as kaolin and montmorillonite, and the like) forming a ratio of substrate and fill material useful for the desired product. Although other additives can be added for color and other desired attributes, it is generally the ratio of substrate and fill material that influences the cost of the plastic used in, for example and without limitation, injection molding and the character of the mixture in terms of smoothness, consistency and the level of impurities, frequently in the form of gapped air or air occlusions. Such impurities cause inconsistency in the substrate-fill material blend, causing flaws and weaknesses in the resulting plastic.

Moreover, the addition of fill material can reduce the cost of plastic blends as fill material costs substantially less than the plastic substrate to which the fill material is added. However, there are limitations with the amount of fill material that can be added to a blend wherein brittleness, less-than-optimal tensile strength and/or Young's modulus, weak points, varying thickness, incomplete fill of injection molds, color variations and other imperfections can result in the desired plastic product. Accordingly, one or more additives that can address these and other issues in the preparation of the fill material and/or formation of polypropylene, polyethylene and polystyrene plastics would be beneficial to the plastics industries.

SUMMARY

One aspect of the present invention provides a plastic modifying, sodium hydroxide, copper sulfate and at least one surfactant selected from the group selected from non-ionic surfactants and anionic surfactants.

An additional aspect of the present invention provides a plastic modifying composition, including aqueous plastic modifying compositions, comprising an aqueous phase comprising a solubility enhancing aqueous composition wherein 1 part of a first solution is added to about 15 to about 20 parts of water to form a second solution; a sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition, optionally comprising the addition of at least one acid or at least one base to adjust the final composition pH to a pH of about 2.5 to about 3.5.

Another aspect of the present invention provides a plastic modifying composition, including aqueous plastic modifying compositions, comprising an aqueous phase comprising a solubility enhancing aqueous composition wherein 1 part of a first solution is added to about 15 to about 20 parts of water to form a second solution; a sodium hydroxide solution having a concentration of about 5% to about 7.5% volume/volume of the total aqueous phase volume of the composition; and copper sulfate having a concentration from about 20 percent to about 26 percent mass/volume of the total aqueous phase volume of the composition, optionally comprising the addition of at least one acid or at least one base to adjust the final composition pH to a pH of about 2.5 to about 3.5.

An additional aspect of the present invention is a plastic forming mixture comprising at least one plastic substrate, at least one fill material and a plastic modifying composition of the present invention wherein the fill material concentration is, for example and without limitation at least 5 percent, at least 10 percent or at least 20 percent weight/weight of the total composition comprising plastic substrate and fill material. Fill material may be increased up to about 80%.

Other aspects of the present invention provide a variety of methods of using a plastic modifying composition of the present invention to form plastic forming mixtures and plastics having particular attributes and characteristics, each of which are further described herein below.

One aspect of the present invention provides a carbonate enhanced composition comprising at least one carbonate and at least one carbonate enhancing composition, which also represents another aspect of the present invention.

Other aspects of the present invention provide a variety of methods of using a carbonate enhanced composition of the present invention to a variety of intermediate and final products as further described herein below.

An additional aspect of the present invention provides a carbonate enhancing composition comprising an aqueous phase comprising a solubility enhancing aqueous composition wherein 1 part of a first solution is added to about 15 to about 20 parts of water to form a second solution; sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition, optionally comprising the addition of at least one acid or at least one base to adjust the final composition pH to a pH of about 2.5 to about 3.5.

Another aspect of the present invention provides an carbonate enhancing composition comprising an aqueous phase comprising a solubility enhancing aqueous composition wherein 1 part of a first solution is added to about 15 to about 20 parts of water to form a second solution and sodium hydroxide solution having a concentration of about 5% to about 7.5% volume/volume of the total aqueous phase volume of the composition; and copper sulfate having a concentration from about 20 percent to about 26 percent mass/volume of the total aqueous phase volume of the composition, optionally comprising the addition of at least one acid or at least one base to adjust the final composition pH to a pH of about 2.5 to about 3.5.

An additional aspect of the present invention provides an antimicrobial composition comprising at least one composition selected from the group consisting of at least one carbonate enhanced composition and at least one carbonate enhancing composition, wherein the carbonate enhancing composition is optionally aqueous.

A further aspect of the present invention provides a product requiring at least one carbonate as an element in the manufacture thereof comprising at least, in part, at least one carbonate enhanced composition used in the manufacture of such product.

An additional aspect of the present invention provides an antimicrobial composition comprising at least one carbonate enhanced composition.

BRIEF DESCRIPTION OF THE DRAWINGS

Features of the present invention will be more fully appreciated by reference to the following detailed description when taken in conjunction with the following drawings in which.

Figure 1:
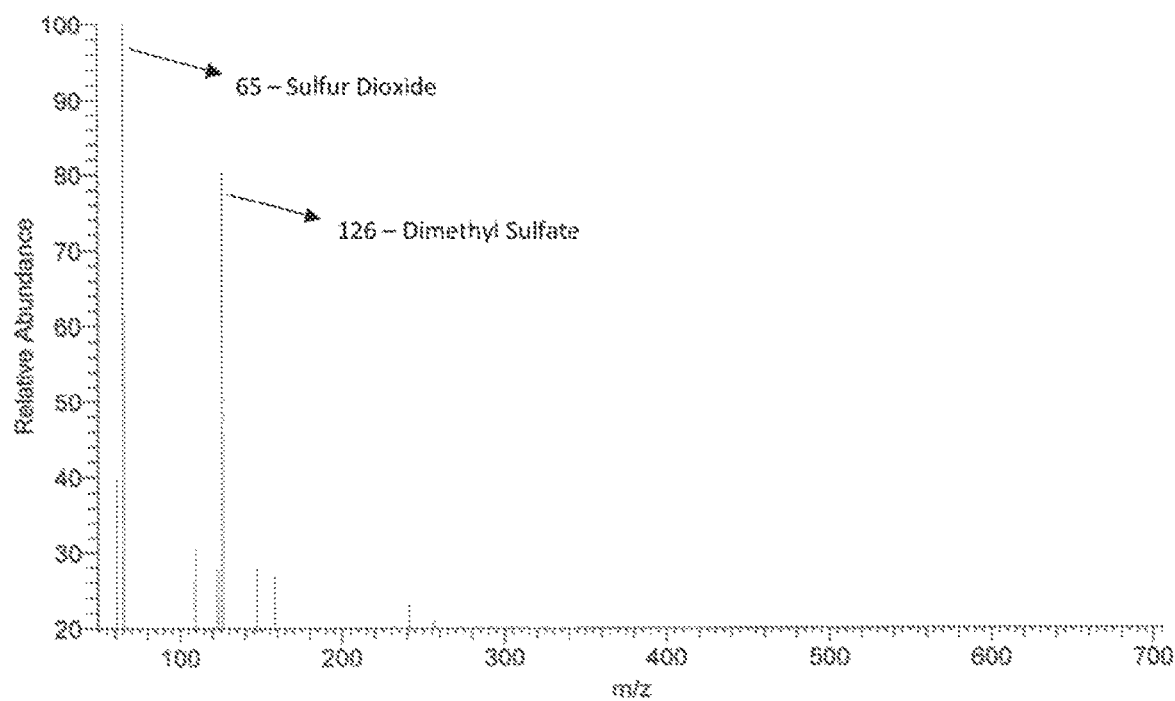
FIG. 1. depicts a low resolution spectrogram with 1 part reaction unit to 5 parts total.
Figure 2:
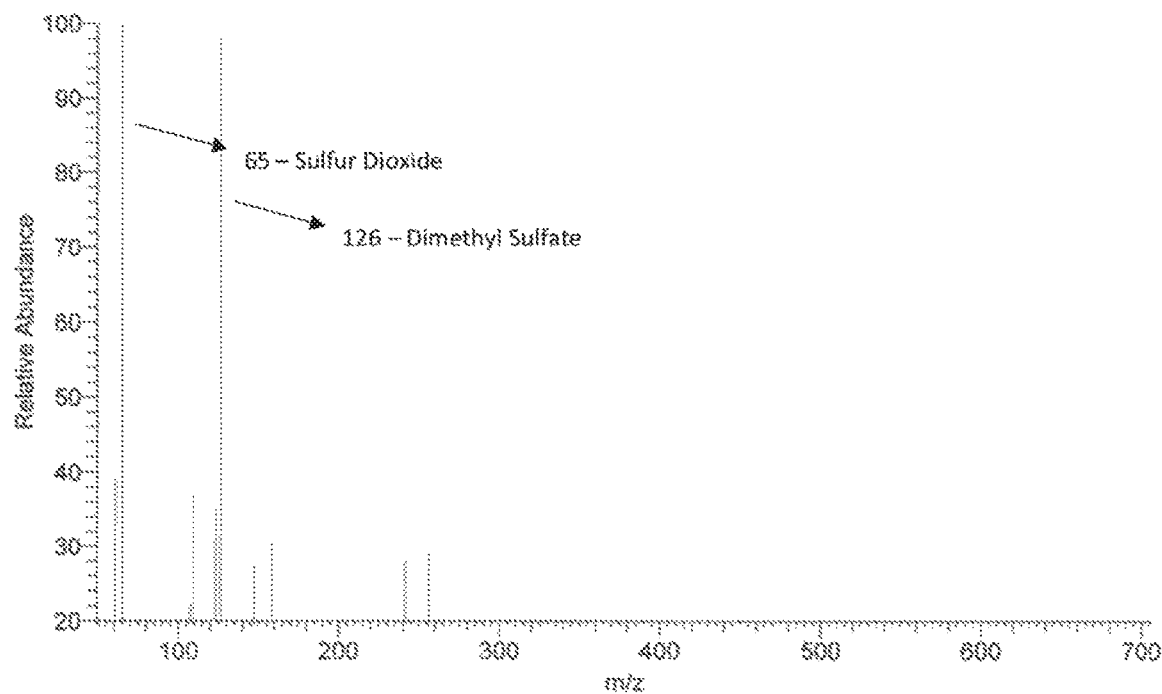
FIG. 2. depicts a high resolution spectrogram with 1 part reaction unit to 5 parts total.
Figure 3:
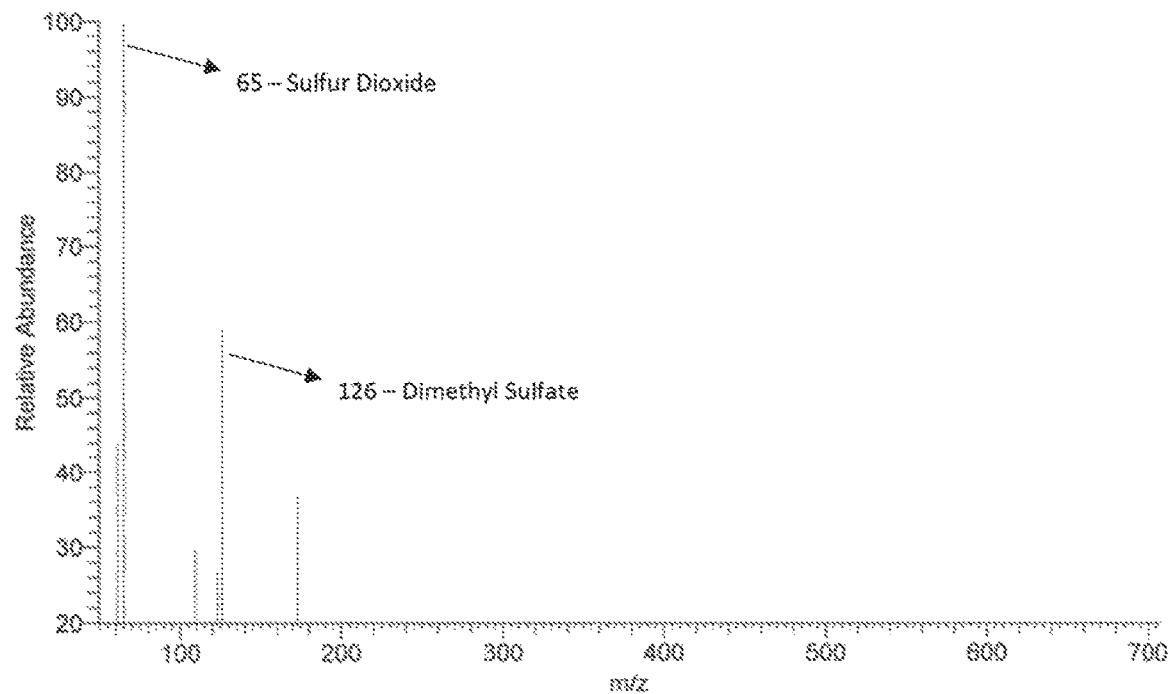
FIG. 3. depicts a low resolution spectrogram with 1 part reaction unit to 10 parts total.
Figure 4:
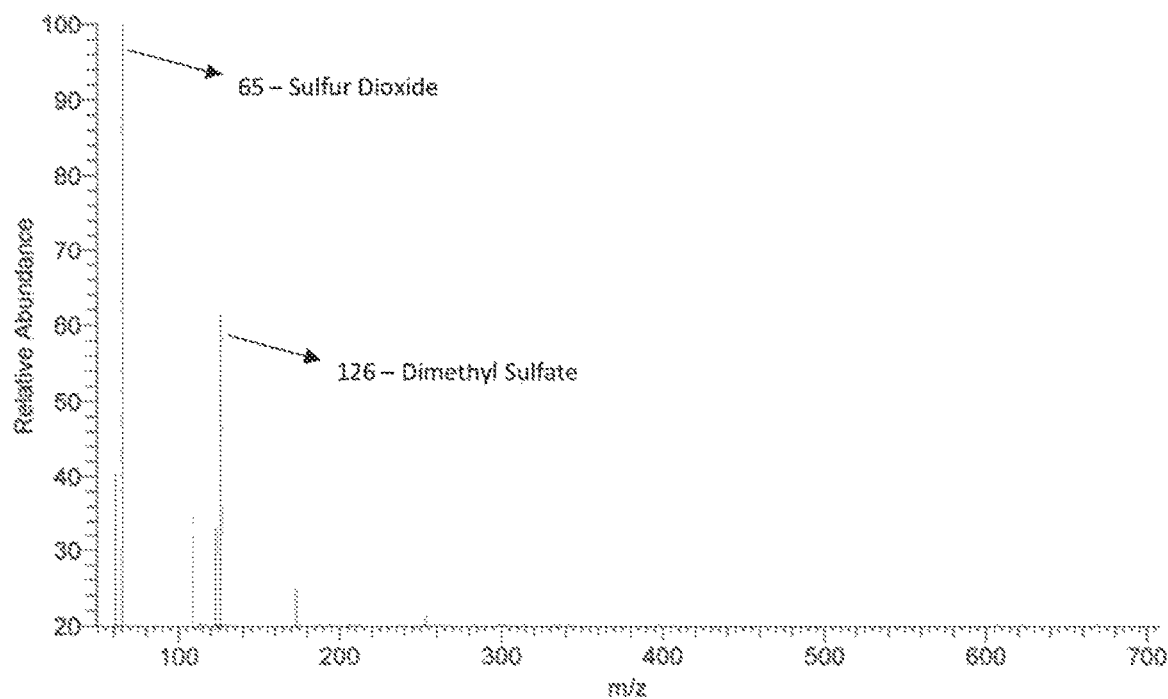
FIG. 4. depicts a high resolution spectrogram with 1 part reaction unit to 10 parts total.
Figure 5:
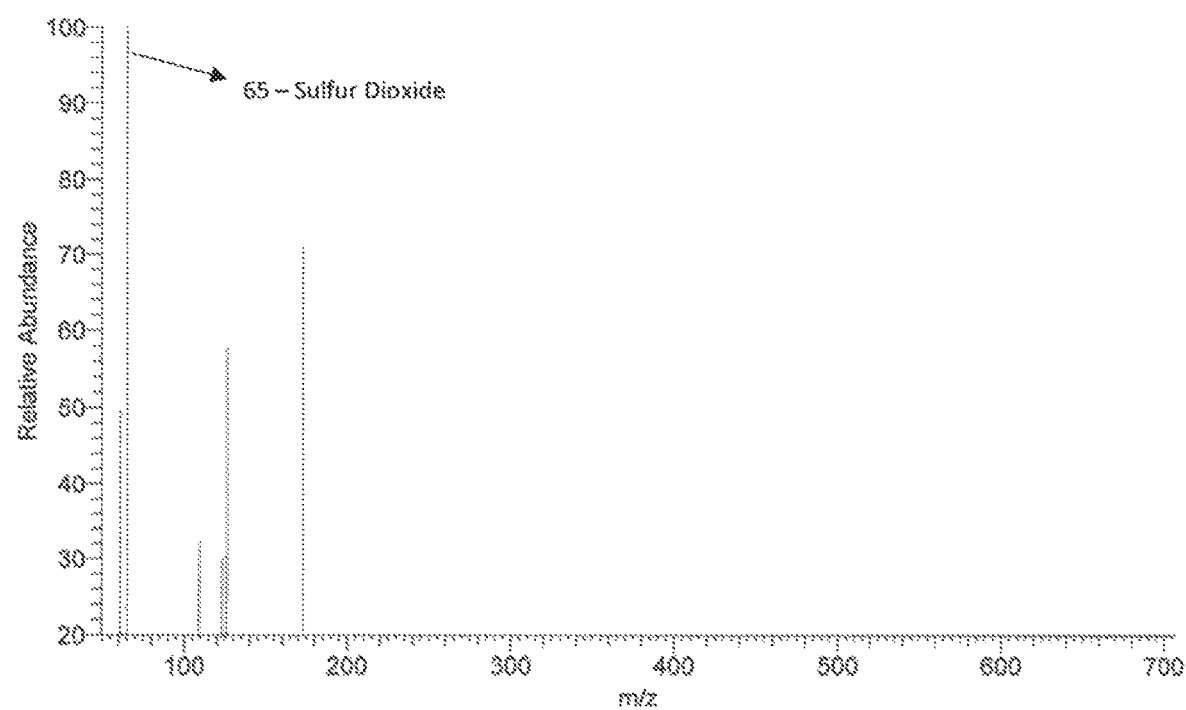
FIG. 5. depicts a low resolution spectrogram with 1 part reaction unit to 20 parts total.
Figure 6:
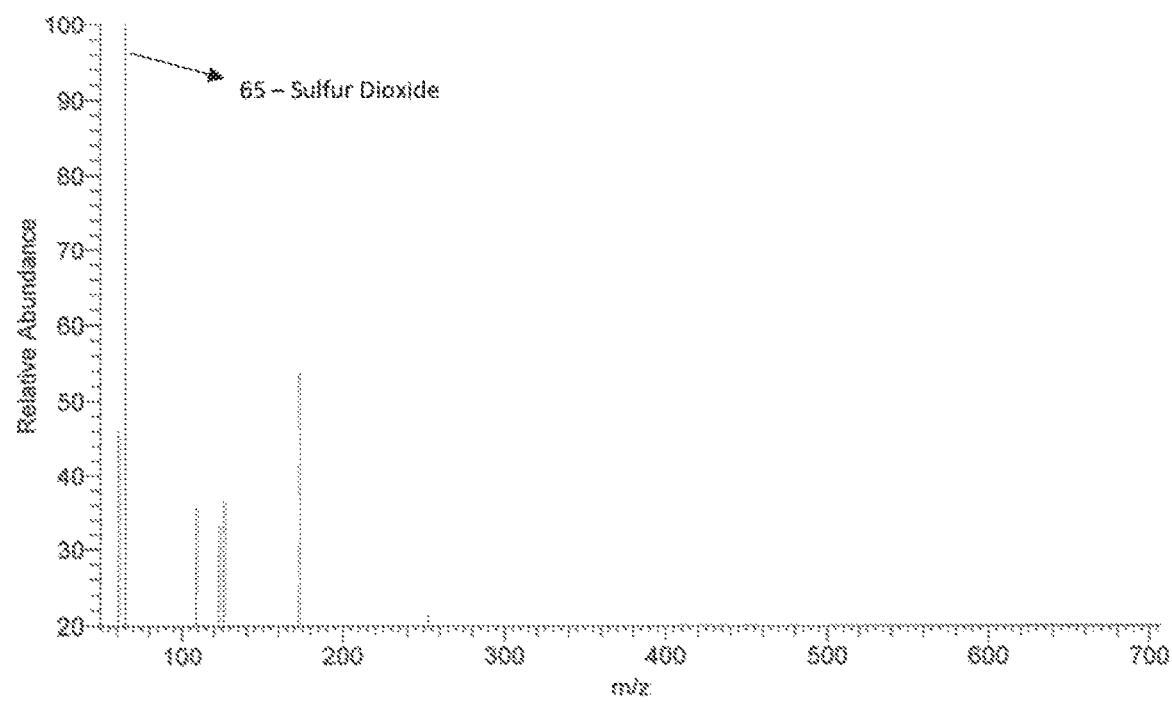
FIG. 6. depicts a high resolution spectrogram with 1 part reaction unit to 20 parts total.

Each of the spectrograms was run according to the respective teachings of Example 6. Each of the spectrograms depicts compositions that are free of salt crystals or other solids formed from the ammonium sulfate and sulfuric acid reactants.

While the aspects of the present disclosure are susceptible to various modifications and alternative forms, specific embodiments thereof are shown by way of example in the drawings and will herein be described in detail. It should be understood, however, that the drawings and detailed description are not intended to limit the disclosure to the particular forms illustrated but, on the contrary, the intention is to cover all modifications, equivalents and alternatives falling within the spirit and scope of the present disclosure as defined by the appended claims. The headings used herein are used for organizational purposes only and are not meant to limit the scope of the description. As used throughout this application, the word "may" is used in a permissive sense, meaning: "having the potential to"; rather than the mandatory sense meaning: "must". Similarly, the words "include", "including" and "includes" means including, without limitation. Additionally, as used in this specification and the appended claims, the singular forms "a", "an" and "the" include singular and plural referents unless the content clearly dictates otherwise.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combinations of features. In particular, with reference to the appended claims, features from dependent claims may be combined with those of independent claims and features from respective independent claims may be combined in any appropriate manner and not merely in the specific combinations enumerated in the appended claims.

DETAILED DESCRIPTION

Definitions

The term "antimicrobial" means antibacterial, anti-fungal and anti-mold, each individually and collectively.

The term "alkali and alkaline metal carbonates" have their traditional meanings in the art.

The term "calcium carbonate" has its traditionally meaning and included, for example and without limitation, ground calcium carbonate and precipitated calcium carbonate, each being prepared in a variety of, for example and without limitation, purities, densities, fineness of grain, morphologies, surface areas, high oil absorption, bulk densities from ultra-low to super high powder densities, and the like.

The term "dilute sodium hydroxide" means at least about a 20 percent concentration of sodium hydroxide in water.

The term "first solution" means a solution of ammonium sulfate and sulfuric acid as further described herein and used in preparing a solubility enhancing aqueous composition.

The term "fill material" means at least one of calcium carbonate, talc, kaolin, montmorillonite and/or one or more other material that is typically added to a substrate for the formation of a final product which includes in part, calcium carbonate. The term "fill material", when used more generally in reference to the enhanced carbonate compositions of the present invention has the traditional meaning as used in the art for the respective product in which the enhanced carbonate composition is used.

The term "final plastic product" means a plastic intermediate and/or end product formed by the mixture of one or more plastic substrate and one or more fill material and, optionally, one or more additive. For the sake of clarity, a final plastic product may be a single product or one or more parts that fits into or forms a larger construct.

The term "free of solids" means that the solubility enhancing aqueous composition do not form salt crystals or other solids that remain in the composition over time, such salt crystals or other solids being formed from the reactants of ammonium sulfate and sulfuric acid.

The term "inhibition" means the act of prophylaxis, retarding and/or controlling the growth of microbes in products as described herein.

The term "microbes" means, individually or collectively, bacteria, fungi and/or mold.

The term "plastic substrate" means an industrial and/or commercial base plastic that is used in the formation of a final plastic product including, for example, polyolefin plastics including, without limitation, polyethylene, polypropylene and ethyl vinyl acetate, and polystyrene. For the sake of clarity, the same name may be used to describe a final, formed plastic such as, for example, a polyethylene and/or polypropylene plastic bag, such final product including fill material and, optionally, other additives, coloring and the like. Such plastic products further include polyvinyl chloride, wood-plastic composites long fiber reinforced plastics and the like.

The term "plastic forming mixture" means a mixture of at least one plastic substrate, at least one fill material and optional additional ingredients used in the preparation or formation of a final plastic product.

The term "polyethylene" has the meanings as set forth in *Ulmann's Encyclopedia of Industrial Chemicals* (Jeremic, D., Polyethylene, *Ulmann's Encyclopedia of Industrial Chemicals* Electronic Release, Wiley—VCH, Weinheim, 2014) which is incorporated herein by reference, including, for example and without limitations, the various forms of polyethylene, copolymers and uses set forth therein. For the sake of clarity, polyethylene plastics include, for example and without limitation, very low density polyethylene (VLDPE), low density polyethylene (LDPE), linear low density polyethylene (LLDPE), medium density polyethylene (MDPE) and high density polyethylene (HDPE).

The term "polypropylene" has the meanings as set forth in *Ulmann's Encyclopedia of Industrial Chemicals* (Gahleitnerm M and Paulik, C, Polypropylene, *Ulmann's Encyclopedia of Industrial Chemicals* Electronic Release, Wiley—VCH, Weinheim, 2014), which is incorporated herein by reference, including, for example and without limitations, the various forms of polypropylene, copolymers and uses set forth therein.

The term "polystyrene" has the meanings as set forth in *Ulmann's Encyclopedia of Industrial Chemicals* (Maul, J, Frushour, B. G., Kontoff, J. R., Eichenauer, H., Ott, K-H. and Schade, C, Polystyrene and Styrene Copolymers, *Ulmann's Encyclopedia of Industrial Chemicals* Electronic Release, Wiley—VCH, Weinheim, 2012), which is incorporated herein by reference, including, for example and without limitations, the various forms of polystyrene, copolymers and uses set forth therein.

The term "product" means any intermediate or final composition of matter composed in part of at least one carbonate, particularly an alkali or alkaline metal carbonate.

The term "reaction unit" relative to the preparation of a solubility enhancing aqueous composition means the desired total volume of a first solution as expressed as a ratio of a range of ammonium sulfate concentrations to sulfuric acid concentrations (the reactants).

The term "second solution" means the first solution as prepared for a final volume plus the requisite amount of water to form a composition of the present invention as further described herein and used in preparing a solubility enhancing aqueous composition.

The term "sodium hydroxide solution" means a sodium hydroxide, typically in a dilute sodium hydroxide solution, wherein the solution can be any dilution as further set forth herein.

The term "solubility enhancing aqueous composition" means the solubility enhancing aqueous compositions as described herein.

The term "sulfate anions" encompasses each of sulfate anions, bisulfate anions and combinations thereof. Combinations of sulfate anions and bisulfate anions are common in the solubility enhancing aqueous compositions described herein.

The term "sulfuric acid" means concentrated sulfuric acid having a concentration of from about 95% to about 98%.

The term "substantially free of solids" means that the solubility enhancing aqueous compositions and/or the enhanced carbonate compositions described herein are at least 95 percent aqueous or, alternatively, at least 98 percent aqueous without the formation of salt crystals or other solids. The addition of materials not an element of the solubility enhancing aqueous compositions and/or carbonate enhancing compositions in the preparation of compositions of the present invention may affect the amount of salts and/or other solids. As such, the term "substantially free of solids" pertains only to the preparations of each of the solubility enhancing aqueous compositions and/or the carbonate enhancing compositions of the present invention described herein.

Description

The following description and examples are included to demonstrate the embodiments of the present disclosure. It should be appreciated by those of skill in the art that the compositions, techniques and methods disclosed in the examples herein function in the practice of the disclosed embodiments. However, those skilled in the respective arts should, in light of the present disclosure, appreciate that changes can be made to the specific embodiments and still obtain a like or similar result without departing from the spirit and scope of the disclosed embodiments.

The present specification includes references to "one aspect/embodiment" or "an aspect/embodiment". These phrases do not necessarily refer to the same embodiment although embodiments that include any combination of the features or elements disclosed herein are generally contemplated unless expressly disclaimed herein. Particular features, processes, elements or characteristics may be combined in any suitable manner consistent with this disclosure.

One aspect of the present invention provides a plastic modifying composition comprising water, at least one solubility enhancing aqueous composition, sodium hydroxide, copper sulfate and at least one surfactant selected from the group consisting of non-ionic surfactants and/or anionic surfactants.

An additional aspect of the present invention provides an aqueous plastic modifying composition comprising an aqueous phase comprising a solubility enhancing aqueous composition wherein 1 part of a first solution in added to about 15 to about 20 parts of water to form a second solution; sodium hydroxide solution having a concentration of about 5% to about 7.5% volume/volume of the total aqueous phase volume of the composition; at least one surfactant selected from the group consisting of non-ionic surfactants and anionic surfactants having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition.

A further aspect of the present invention further comprises the addition of an acid or base to adjust the pH to a pH from about 2.5 to about 3.5 to the immediately preceding composition.

Another aspect of the present invention provides an aqueous plastic modifying composition comprising an aqueous phase comprising: a solubility enhancing aqueous composition wherein 1 part of a first solution in added to about 15 to about 20 parts of water to form a second solution and sodium hydroxide solution having a concentration of about 5% to about 7.5% volume/volume of the total aqueous phase volume of the composition; and copper sulfate having a concentration from about 20 percent to about 26 percent mass/volume of the total aqueous phase volume of the composition.

A further aspect of the present invention further comprises the addition of an acid or base to adjust the pH to a pH from about 2.5 to about 3.5 to the immediately preceding composition.

An additional aspect of the present invention is a plastic forming mixture comprising at least one plastic substrate, at least one fill material and a plastic modifying composition of the present invention wherein the fill material concentration is, for example and without limitation at least 2.5 percent, at least 5 percent, at least 10 percent or at least 20 percent weight/weight of the total composition comprising plastic substrate and fill material.

A further aspect of the present invention is a plastic forming mixture comprising at least one plastic substrate selected from the group consisting essentially of polyethylene, polypropylene and polystyrene, at least one fill material and a plastic modifying composition of the present invention wherein the fill material concentration is at least 2.5 percent, at least 5 percent, at least 10 percent or at least 20 percent weight/weight of the total composition comprising plastic substrate and fill material.

Another aspect of the present invention provides a method of inhibiting microbial growth in a product comprised at least in part of at least one carbonate enhanced composition in manufacturing such product.

Another aspect of the present invention provides a method of inhibiting microbial growth in a product comprised at least in part of at least one plastic modifying composition in manufacturing such product.

Other aspects of the present invention provide a variety of methods of using a plastic modifying composition of the present invention to form plastics having particular attributes and characteristics, each of which are further described herein below.

One element of the present plastic modifying compositions provides a solubility enhancing aqueous composition comprising a first solution comprising an anionic component consisting essentially of sulfate ions, alone or in combination with bisulfate ions, having a concentration from about 8.00 moles per liter to about 13.00 moles per liter of the first solution volume, and a cationic component consisting essentially of ammonium ions having a concentration from about 1.45 moles per liter to about 2.01 moles per liter of the first solution volume, combined with a volume of water at least equal to the volume of the first solution forming a second solution. Generally, the first solution of this composition will also comprise hydrogen ions in a concentration from about 17.38 to about 21.68 moles per liter of the total volume of the first solution.

An alternative element of the present plastic modifying composition provides a solubility enhancing aqueous composition comprising a first solution comprising an anionic component comprising sulfate ions, alone or in combination with bisulfate ions, having a concentration from about 8.00 moles per liter to about 13.00 moles per liter of the first solution volume, and a cationic comprising ammonium ions having a concentration from about 1.45 moles per liter to about 2.01 moles per liter of the first solution volume, combined with a volume of water at least equal to the volume of the first solution forming a second solution. Generally, the first solution of this composition will also comprise hydrogen ions in a concentration from about 17.38 to about 21.68 moles per liter of the total volume of the first solution.

It is the intent of the present disclosure to permit the skilled artisan to prepare a solubility enhancing aqueous composition element using a range of water in a ratio to the concentrations of ammonium sulfate and sulfuric acid for each preparation, with the resultant sulfate anions and ammonium cations, and the amount of water to be determined by such artisan, each within the parameters taught herein.

For the sake of clarity, three solutions are formed in preparing the second solution which comprise solubility enhancing aqueous compositions: 1) ammonium sulfate stock solution; 2) a first solution comprising the ammonium sulfate stock solution in sulfuric acid; and 3) second solution comprising solubility enhancing aqueous compositions. Unless context otherwise dictates, general references to the use of a first solution and a second solution refers to the preparation of the referenced solubility enhancing aqueous compositions used in the preparation of plastic modifying agent compositions of the present invention.

To prepare the first solution of a composition of the present disclosure, one needs to first prepare an ammonium sulfate stock solution. For example and without limitation, an ammonium sulfate stock solution is prepared to contain 20%, 24%, 30%, 40%, 50% or 60% of ammonium sulfate in water, typically, without restriction, deionized water. For the sake of clarity, the percent concentration of ammonium sulfate can be any whole number or fraction thereof in a range from about 20% to about 60%. The molar concentration of the stock solution varies by the ammonium sulfate concentration in a known volume of water.

By means of exemplification, the following calculations are used to determine the amount of ammonium sulfate and sulfuric acid to add to form a first solution.

Ammonium Sulfate:

Ammonium sulfate equals 132.14 grams per mole. Using, for example, a 24% ammonium sulfate solution, such solution would have 240 grams of ammonium sulfate per 1 L of water. Because the ratio of ammonium sulfate to sulfuric acid in this exemplification is about 48% ammonium sulfate to about 52% sulfuric acid, the first solution would contain 115.20 grams of ammonium sulfate, equaling 0.872 moles per liter. As such, one mole of ammonium sulfate provides 2 moles of ammonium and 1 mole of sulfate. Accordingly, 0.872 moles of ammonium sulfate provides to the ammonium sulfate stock solution 1.744 moles of ammonium and 0.872 moles of sulfate required per liter of reaction in forming the first solution.

Sulfuric Acid (Concentrated):

Sulfuric acid equals 98.079 g/mole as concentrated (95% to 98%) reagent grade sulfuric acid. Sulfuric acid exists as a liquid and has a density of 1.840 g/mL. For this example, sulfuric acid comprises 52% of a first solution of 1 liter. As such, 520 mL (0.52 L) of sulfuric acid is added to the ammonium sulfate stock solution. 520 mL times 1.840 g/mL equals 956.8 grams. 956.8 grams divided by 98.079 grams per mole provides the target concentration of 9.755 moles of sulfuric acid per liter of preparation. 9.755 moles of sulfuric acid provides 9.755 moles of sulfate anion and 2 moles of hydrogen resulting from each mole of acid, in this example, 19.51 moles of hydrogen per liter of said first solution.

Reaction Unit:

Using the values set forth above, in this instance, there are about 0.872 moles of ammonium sulfate to about 9.755 moles of sulfuric acid providing:

about 0.872 moles of ammonium sulfate provides about 0.872 moles of sulfate and about 1.744 moles of ammonium required per reaction unit liter; and about 9.755 moles per liter of sulfuric acid provides about 9.755 moles of sulfate anion and about 19.51 moles of hydrogen per liter of reaction unit.

Using this example, each reaction unit, forming a first solution, would contain:

about 0.972 moles of sulfate (from ammonium sulfate) plus about 9.755 moles of sulfate from ammonium sulfate equaling about 10.627 moles of sulfate anion per liter comprising sulfate anions alone, bisulfate anions alone or, typically, a mixture of sulfate and bisulfate anions;

about 1.744 moles of ammonium per liter; and about 19.51 moles of hydrogen per liter.

To accomplish the formation of a solubility enhancing aqueous composition, a second solution is formed by the addition of water, a critical component, in an appropriate amount, to provide solubility enhancing aqueous compositions that are substantially free, or free, of solids. Alternatively, a first solution can be added to the appropriate amount of water to form a second solution. As such, the order of addition of a first solution to water or water to the first solution to form a second solution is not of consequence. Use of the solubility enhancing aqueous compositions may form solids when combined with other chemical or other materials when using such solubility enhancing aqueous compositions for its intended purpose: enhancing solubility of such chemical compounds or other materials.

Generally, water is at least fifty percent of the second solution that represents the solubility enhancing aqueous compositions. Moreover, water can comprise from at least fifty percent up to ninety-nine percent of the second solution or final composition. However, the lower concentrations of water, as taught herein, are typically more useful for further use of the present compositions used for solubility enhancement. Accordingly, the amount of water used to form a second solution is at least 50% of the volume of the first solution or at least 50% of the mass of the first solution. Alternatively, the mass of the sum of the ammonium ion concentration plus sulfate ion concentration in a first solution can also serve as the basis of the amount of water to be added to form a second solution wherein the amount of water added, by mass, to form a second solution equals at least 50% of the sum of the mass of ammonium ions plus sulfate ions. Another means by which to represent the amount of water added to the first solution is that the amount of water used to form a second solution is at least equal to the volume of the first solution or at least equal to the mass of the first solution. Alternatively, the mass of the sum of the ammonium ions plus sulfate ions in a first solution can also serve as the basis of the amount of water to be added to form a second solution wherein the amount of total water, including the water used to solubilize the ammonium sulfate and added water, is at least equal to the sum of the mass of ammonium ions plus sulfate ions.

The amount of water used to prepare the second solution, representing solubility enhancing aqueous compositions, can be calculated in volume/volume (total volume of the first solution plus at least the same volume of water). Alternatively, the ratio of reactants to water (mass/mass) may be used. Using the values for ammonium sulfate and sulfuric acid from the above example, 115.20 grams of ammonium sulfate and 956.8 grams of sulfuric acid were used providing a sum of 1072 grams of reactants. Accordingly, for water to equal at least fifty percent of the final composition, at least 1072 grams of water are added to the first solution to form the second solution, a solubility enhancing aqueous composition. Alternatively, as referenced above, the amount of water used to form a second solution can be based on the total mass or volume of the first solution. Accordingly, any method taught herein can be used for calculating the amount of water required to form a second solution. As taught above, using the mass of the reactants to dictate the amount of water required to form a second solution is the minimum amount of water required to provide an aqueous solution and to impart the qualities of the compositions of the present invention as further delineated herein.

To achieve solubility enhancement, ranges of concentration of sulfate ions and ammonium ions in the solubility enhancing aqueous compositions are used while maintaining solubility enhancing aqueous compositions that are essentially free or are free of salt crystals or other solids from the reactants that form a first solution. Accordingly, a first solution comprises an anionic component consisting essentially of sulfate ions, alone or in combination with bisulfate ions, has a concentration range from about 8.00 moles per liter to about 13.00 moles per liter of the first solution volume. The first solution also comprises a cationic component consisting essentially of ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume.

In another embodiment of the solubility enhancing aqueous compositions, a first solution comprises an anionic component comprising sulfate ions, alone or in combination with bisulfate ions, has a concentration range from about 8.00 moles per liter to about 13.00 moles per liter of the first solution volume. The first solution also comprises a cationic component comprising ammonium ions has a concentration from about 1.45 moles per liter to about 2.01 moles per liter of the first solution volume. Typically, when the lower values within the range for sulfate ions are selected for preparing a first solution, a lower value within the stated range for ammonium ions is selected and included in the preparation of the first solution. Similarly, when higher values within the stated range for sulfate ions are selected for the preparation of a first solution, higher values of ammonium ions are selected for the preparation of a first solution. Although not imperative, typically, the sulfate ion concentration within the given range of from about 8.00 moles per liter to about 13.00 moles per liter of first solution volume is proportionally commensurate with the range of ammonium ion concentration within the given the given range of from about 1.45 moles per liter to about 2.01 moles per liter of first solution volume. When prepared according to the solubility enhancing aqueous composition embodiments provided herein, the resulting hydrogen ion concentration will typically fall within the range from about 17.38 moles per liter to about 21.68 moles per liter of first solution volume but falling within this hydrogen range is not necessarily critical to the final first solution but is beneficial when using the solubility enhancing aqueous compositions for enhancing solubility of compounds or other materials depending upon the nature thereof.

The process for preparing the solubility enhancing aqueous compositions can be carried out using traditional laboratory and safety equipment when using concentrated acid and water that could generate significant heat. Within these considerations, the selection of laboratory equipment is not critical to the formation of the solubility enhancing aqueous solutions or compositions. More particularly, the preparation of the first solution wherein the reactants ammonium sulfate stock solution is combined with sulfuric acid requires laboratory apparatuses that are approved for heat generation, splashing and, potentially, pressure relief. Accordingly, the first solution should be prepared in a laboratory vessel that is not sealed providing for pressure relief, rather than a potential hazardous situation with pressure build up in an unrated vessel. The ordinarily skilled artisan should be knowledgeable in the selection and use of such apparatuses.

For commercial-scale production of solubility enhancing aqueous compositions, the ordinarily skilled artisan will recognize that the reaction between the solubilized ammonium sulfate and sulfuric acid is typically exothermic. As such, a reaction vessel appropriate to safely contain and, typically, cool this reaction, is recommended. Commercial production of a first solution and a second solution can be accomplished using any of the teachings herein but on a larger scale than the laboratory scale teachings and examples disclosed herein. Moreover, such commercial production can be accomplished, without limitation, as taught herein or with equipment known to the ordinarily skilled artisan.

The order of adding the reactants to each other is not critical in the preparation of a first solution. Either the stock ammonium sulfate solution can be added to the sulfuric or, more typically, sulfuric acid is added to the stock ammonium sulfate stock solution to avoid the splattering typical of adding a solution containing water to acid. Typically, the heat generating reaction forming the first solution is permitted to run to conclusion, with the term "conclusion" having the meaning understood by the ordinarily skilled artisan, prior to adding the first solution to the required water or water to the first solution, without preference to the order of addition. For the sake of clarity, conclusion of the reaction between the ammonium sulfate stock solution and sulfuric acid typically occurs when the reactants no longer produce an exothermic reaction and the temperature of the solution begins to decrease to ambient temperature.

Alternatively, the formation of a first solution is not required and the ammonium sulfate stock solution and sulfuric acid can be combined with the final desired volume of a solubility enhancing aqueous compositions. Accordingly, another aspect of the solubility enhancing aqueous compositions provides a solubility enhancing aqueous composition comprising an anionic component consisting essentially of sulfate anions having a concentration from about 8.00 moles per liter to about 13.00 moles per liter of about one-quarter of the final solubility enhancing aqueous composition volume and a cationic component consisting essentially of ammonium ions having a concentration from about 1.45 moles per liter to about 2.01 moles per liter of about one-quarter of the final solubility enhancing aqueous composition volume or less, and water comprising at least one-half of the final composition volume.

An alternate solubility enhancing aqueous composition comprises an anionic component comprising sulfate anions having a concentration from about 8.00 moles per liter to about 13.00 moles per liter about one-half of the final solubility enhancing aqueous compositions volume and a cationic component comprising ammonium ions having a concentration from about 1.45 moles per liter to about 2.01 moles per liter of about one half of the final solubility enhancing aqueous composition volume.

Another alternate solubility enhancing aqueous composition comprises an anionic component consisting essentially of sulfate anions having a concentration from about 8.00 moles per liter to about 13.00 moles per liter and a cationic component consisting essentially of ammonium ions having a concentration from about 1.45 moles per liter to about 2.01 moles per liter of the final solubility enhancing aqueous composition volume wherein said liter volume for calculation for the volume of water comprising the ammonium ions and sulfate anions comprises at least one percent of the total volume of the solubility enhancing aqueous composition.

A further alternate solubility enhancing aqueous composition comprises an anionic component consisting essentially of sulfate anions having a concentration from about 8.00 moles per liter to about 13.00 moles per liter of not more than about one-half of the final solubility enhancing aqueous composition volume and a cationic component consisting essentially of ammonium ions having a concentration from about 1.45 moles per liter to about 2.01 moles per liter of not more than about one-half the final solubility enhancing aqueous composition volume.

An additional alternate solubility enhancing aqueous composition comprises an anionic component comprising sulfate anions having a concentration from about 8.00 moles per liter to about 13.00 moles per liter of not more than about one-half of the final solubility enhancing aqueous composition volume and a cationic component comprising ammonium ions having a concentration from about 1.45 moles per liter to about 2.01 moles per liter of not more than about one-half the final solubility enhancing aqueous composition volume.

Although certain aspects of the solubility enhancing aqueous compositions allow for highly dilute concentrations for the ammonium cations and sulfate anions, specific concentrations of these ions can be calculated on a basis as if such combination were prepared on a per liter basis wherein the volume of such preparation comprises 1%, 10%, 20%, 30%, 40%, 48%, 50% or 60% of the total volume of the final solubility enhancing aqueous composition. For the sake of clarity, the volume of water can be any whole number or fraction thereof in a range from about 1% to about 60%. In addition, the volume of total water in each of the solubility enhancing aqueous compositions taught herein can be calculated by a variety of methods as taught herein and are not limited by any one teaching. As such, the amount of water used to form a second solution can be based on weight/weight (first solution weight to the weight of water added to form a second solution); mass/mass (first solution mass to the mass of water added to form a second solution; and mass/mass (the mass of the sum of ammonium ions and sulfate ions to the mass of total water in the second solution). Each of these methods can be used in a two-step process wherein a first solution is formed and water is added to form a second solution, or a one-step process where the elements of a second solution of the present invention are pre-calculated and added accordingly.

One benefit of using the solubility enhancing aqueous compositions for solubility enhancement is for industrial applications, particularly when solutions are sprayed in the formation of products or finishes that must have a high degree of consistency and/or smooth surfaces. Products used for solubilization of other materials, typically metals, frequently have a significant percentage of solids in such products, minimizing the consistency of coating, leaving imperfections on the coated surface. Moreover, a variety of low and high-pressure nozzles are used for deposition of such coatings or to blend with other materials in the preparation of various products. In these instances, any degree of solids used in the sprayed material creates wear on the spray nozzles, even nozzles made with stainless steel or other wear-resistant materials. Worn nozzles, even slightly worn nozzles for critical depositions, especially high pressure depositions, result in inconsistent depositions in terms of coating and/or thickness, rendering the process more expensive and, potentially, a need to rework or destroy the material on which the coatings are deposited. Similar benefits, among others, may be obtained when using enhanced carbonate compositions of the present invention, including aqueous plastic modifying compositions.

The solubility enhancing aqueous compositions can also be used for preparation of the plastic modifying compositions of the present disclosure. Although there is over one hundred years of history in discovering and making polyethylene, polypropylene and polystyrene plastic and products made therefrom, challenges remain and are open to innovations to address such challenges. For example, the cost of plastic substrates contributes significantly to the cost of final plastic products. Such costs can be mitigated by adding a higher percentage of fill material relative to the percentage of plastic substrate used. However, increased fill material concentrations frequently lead to problems with completely filling molds used for manufacturing plastic final products, lack of homogeneity within plastic forming mixtures, potential impurities, frequently in the form of occluded air bubbles in the plastic forming mixture and final plastic products, and undesired attributes in the final product such as, without limitation, brittleness, lack of rigidity when desired, limited shelf-life, limitations on recycling and the like. Also, there are price differences in plastic substrates compared to other plastic substrates wherein, for example, polystyrene is more expensive than polypropylene. As such, being able to replace polystyrene with polypropylene at the same concentration in a final plastic product would provide cost savings to the manufacturer. The present plastic modifying compositions can be used to address these and other present-day challenges in the manufacture of final plastic products and provide a variety of methods of use are additional aspects of the present plastic modifying compositions.

Accordingly, an additional aspect of the present invention provides an aqueous plastic modifying composition comprising an aqueous phase comprising: a solubility enhancing aqueous composition wherein 1 part of a first solution is added to about 15 to about 20 parts of water to form a second solution; sodium hydroxide solution having a concentration of about 5% to about 7.5% volume/volume of the total aqueous phase volume of the composition; at least one surfactant selected from the group consisting of non-ionic surfactant and anionic surfactant having a concentration from about 0.05 percent to about 0.15 percent volume/volume of the total aqueous phase volume of the composition; and copper sulfate having a concentration from about 20 percent to about 26 percent mass/volume of the total aqueous phase volume of the composition.

A further aspect of the present invention further comprises the addition of an acid or base to adjust the pH to a pH from about 2.5 to about 3.5 to the immediately preceding composition.

Another aspect of the present invention provides an aqueous plastic modifying composition comprising an aqueous phase comprising: a solubility enhancing aqueous composition wherein 1 part of a first solution in added to about 15 to about 20 parts of water to form a second solution and sodium hydroxide solution having a concentration of about 5% to about 7.5% volume/volume of the total aqueous phase volume of the composition; and copper sulfate having a concentration from about 20 percent to about 26 percent mass/volume of the total aqueous phase volume of the composition.

A further aspect of the present invention further comprises the addition of an acid or base to adjust the pH to a pH from about 2.5 to about 3.5 to the immediately preceding composition.

For the preparation of the above-referenced aqueous plastic modifying composition, a 20 percent to 50 percent dilute sodium hydroxide solution is prepared using techniques well known to the skilled artisan. The range of sodium hydroxide concentration in the present aqueous plastic modifying compositions is based on varied concentrations of sodium hydroxide. When higher concentration sodium hydroxide solutions are used, one would typically use the lower concentration range of about 0.5% volume/volume of the total aqueous element volume of the composition. Conversely, when lower concentration sodium hydroxide solutions are used, one would typically use the higher concentration range of about 0.75% volume/volume of the total aqueous element volume of the composition. Total aqueous element volume composition means the sum volume of the aqueous components of the present composition including the solubility enhancing aqueous composition, sodium hydroxide solution and surfactant.

Various aqueous concentrations of non-ionic and anionic surfactants are commercially available, frequently found in concentrations of about 20% to about 80% in water. Such surfactants can also be prepared by diluting concentrated non-ionic surfactant and/or anionic surfactants in water to desired concentrations. Accordingly, such surfactants having a concentration of 20%, 30%, 40%, 50%, 60%, 70% and 80% are useful in the present composition. Generally, surfactant concentrations of at least 20% in water are useful. More particularly, a 50% concentration of Glucopon® 420 in water (available from multiple vendors including, for example, BASF Corp., Florham Park, N.J., USA) is useful as a nonionic surfactant in the present aqueous plastic modifying compositions. When higher concentration surfactant solutions are used, one would typically use the lower concentration range of about 0.05% volume/volume of the total aqueous element volume of the composition. Conversely, when lower concentration surfactant solutions are used, one would typically use the higher concentration range of about 0.15% volume/volume of the total aqueous element volume of the composition.

Additionally, a solubility enhancing aqueous composition is prepared wherein 1 part of a first solution, as described above, is added to about 15 to about 20 parts of water to form a second solution.

For preparation of the aqueous plastic modifying composition of the present invention, to the solubility enhancing aqueous composition is added dilute sodium hydroxide (about 20% to about 50%) having a concentration of about 5% to about 7.5% volume/volume of the total aqueous element volume of the composition. The surfactant element of the present composition can be added to this aqueous solution or can optionally be added following the addition of the copper sulfate element. However, the calculation for the concentration of the surfactant is based on the total aqueous element volume of the composition as if the copper sulfate had not yet been added. The at least one surfactant is selected from the group consisting of non-ionic surfactant and anionic surfactant having a concentration from about 0.05 percent to about 0.15 percent volume/volume of the total aqueous element volume of the composition.

The copper sulfate element of the present aqueous plastic modifying composition is added to the aqueous solution described above at a concentration from about 20 percent to about 26% mass/volume of the total aqueous element volume of the composition.

Once the present composition is prepared, the final pH should be adjusted to a pH of from about 2.5 to about 3.5 with a pH of about 3.0 being typically used. Any base or acid can be used to increase or decrease, respectively, the pH of such a composition. However, it is best to utilize acids and bases already used in the present compositions; dilute sodium hydroxide to increase the pH and sulfuric acid to decrease the pH. Alternatively, pH is controlled throughout the various steps of preparation of an aqueous plastic modifying composition of the present invention. For example, pH can be adjusted to the ranges set forth above following the addition of dilute sodium hydroxide to the previously prepared solubility enhancing aqueous composition, and then again following the addition of copper sulfate and, optionally, following the addition of copper sulfate and the anionic and/or nonionic surfactant. As such, the pH is adjusted at least one time during preparation of an aqueous plastic modifying composition, typically following the addition of the copper sulfate and/or surfactant.

The process for preparing the carbonate enhancing compositions, including aqueous carbonate enhancing compositions, can be carried out using traditional laboratory and safety equipment when using concentrated acid and water that could generate significant heat. Within these considerations, the selection of laboratory equipment is not critical to the formation of the carbonate enhancing compositions and/or aqueous carbonate enhancing compositions. The ordinarily skilled artisan should be knowledgeable in the selection and use of such apparatuses.

For larger scale production batches of such carbonate enhancing compositions of the present invention, including aqueous plastic modifying compositions, such compositions are prepared based on the percentages taught herein above of the elements required for preparation of such compositions. As a non-limiting example, such compositions can be prepared as follows: to produce 330 gallons of finished product, to an adequate-sized tank having circulation mixing, is about 2,116 pounds of 17 megohm water, typically, distilled water, about 183 pounds of a solubility enhancing aqueous composition, with continued mixing, about 183 pounds of 50% sodium hydroxide that is slowly added to the prior mixture, with continued mixing, about 590 pounds copper sulfate, with continued mixing to maintain the copper sulfate in solution, and about 2 pounds of 50% Glucopon® 420 UP, with continued mixing for at least about one hour. It is beneficial to adjust the pH after addition of each subsequent element beginning with the addition of the solubility enhancing aqueous composition. pH should be adjusted to be in the range from about pH 2.5 to about pH 3.5 with a median of pH 3.0 being a reasonable target. Lowering the pH is accomplished by any reasonable means known to the skilled artisan but it is recommended to add an appropriate amount of a solubility enhancing aqueous composition; and increasing the pH can be accomplished by any means known to the skilled artisan but is recommended to add an appropriate amount of sodium hydroxide, particularly 50% sodium hydroxide.

Aqueous plastic modifying compositions are not limited to use in the preparation of plastics. Such compositions, as carbonate enhancing compositions as described herein, are also useful for preparing enhanced carbonate compositions as further taught herein and are substantially the same as the plastic modifying compositions of the present invention using at least one of calcium carbonate and another alkali and/or alkaline metal carbonate. As such, as used herein, aqueous plastic modifying compositions and aqueous carbonate enhancing compositions are the same formulation and are used interchangeably herein with the only difference being that the aqueous plastic modifying compositions are used for the preparation and formation of plastics whereas use of the term "carbonate enhancing compositions" has a broader meaning that includes the use of such compositions for the carbonates referenced herein or other such carbonates. In essence, aqueous plastic modifying compositions are included in the definition of carbonate enhancing compositions.

The intent and benefit of the present aqueous plastic modifying composition, and potentially, all aqueous is to provide an aqueous solution that is substantially free of solids. However, not all aqueous plastic modifying compositions or carbonate enhancing compositions will be free or substantially free of solids.

The aqueous plastic modifying compositions of the present invention are generally added to a plastic substrate, a fill material and/or a plastic forming mixture prior to injection or extrusion of a plastic forming mixture in the formation of a final plastic product to assist in forming a homogenous or near homogeneous (at least 95% homogeneous) plastic forming mixture. Forming a plastic forming mixture having a high degree of homogeneity is typically a challenge when using higher-than-normal amounts of fill material. A higher degree of homogeneity of the plastic forming mixture typically provides fewer impurities in the form of occluded/gapped air resulting in more complete and more consistent fill of injection and other types of plastic molds.

Generally, the concentrations of the present aqueous plastic modifying compositions are based on the percent fill material in a plastic forming mixture. Typically, the plastic forming mixtures comprise from about 20 percent to about 40 percent of fill material but can be up to about or greater than 80 percent of fill material. The present aqueous plastic modifying compositions are, for example, applied at concentrations relative to the concentration of fill material. Typically, the present aqueous plastic modifying compositions are used at a concentration from about 500 ppm to about 20,000 ppm relative to the amount of fill material used in a final plastic forming mixture. For example and without limitation, when using 20 percent fill material in the preparation of a plastic forming mixture, the present aqueous plastic modifying compositions are used at a concentration from about 500 ppm to about 1500 ppm relative to the amount of the fill material used in the final plastic forming mixture; typically at a concentration of about 1000 ppm. Further, for example and without limitation, when using 40 percent fill material in the preparation of a plastic forming mixture, the present aqueous plastic modifying compositions are used at a concentration from about 3000 ppm to about 5000 ppm relative to the amount of the fill material used in the final plastic forming mixture; typically at a concentration of about 3500 ppm.

Fill material typically is hygroscopic and will absorb additional atmospheric water following the preparation of the fill material and/or following blending fill material with plastic substrate to form a plastic forming mixture. Drying the fill material via, for example and without limitation, vacuum heat, before use with the aqueous plastic modifying compositions of the present invention as taught herein can improve the flow of the plastic forming mixture and the consistency of final plastic product.

The present compositions permit the use of higher percentages of fill material in plastic forming mixtures than is typically possible that permits the use of cheaper plastic substrates to accomplish the same desired end characteristics of the resulting final plastic product. For example, it is now possible with the use of the present aqueous plastic modifying compositions to make certain final plastic products previously made from polystyrene substrate with polypropylene substrate, decreasing the cost of the final plastic product. The use of the present compositions, with or without additional fill material than is traditionally used, can make final plastic products more rigid and less brittle using polypropylene substrate than those made with polystyrene substrate. However, this can be better accomplished by increasing the percent of fill material to greater than 40% which is made possible by the addition of the present aqueous plastic modifying compositions to plastic forming mixtures prior to molding. In effect, these plastic forming mixtures, including the present composition, are susceptible to more complete and uniform heating resulting in better homogeneity and uniform and complete mold fill. As such, the present invention further provides a method for substituting polypropylene for polystyrene comprising the addition of an aqueous plastic modifying agent of the present invention to a polypropylene plastic forming mixture having a fill material greater than 40 percent wherein an aqueous plastic modifying composition is added to a polypropylene substrate plastic forming material at a concentration of from about 2.5 thousand ppm to about 3.5 thousand ppm relative to the amount of fill material used in such plastic forming mixture.

In addition, the present aqueous plastic modifying compositions improve the characteristics of polypropylene by reducing the brittleness of polypropylene final plastic products and improving the tensile strength thereof. When used in polypropylene final plastic prepared foods containers that requires heating via a heat source including, for example and without limitation, microwaves, the addition of such compositions to such polypropylene final plastic prepared food containers provides an end product that reduces cooking time and improved food taste compared to the use of polystyrene final plastic prepared food containers. As such, another aspect of the present invention is a method of reducing the cooking time of prepared foods requiring heating in polypropylene final plastic prepared food containers compared to polystyrene final plastic prepared food containers comprising formation of polypropylene plastic prepared food containers via the addition of an aqueous plastic modifying agent of the present invention to a polypropylene plastic forming mixture wherein an aqueous plastic modifying composition is added to a polypropylene substrate plastic forming material at a concentration of from about 2.5 thousand ppm to about 3.5 thousand ppm relative to the amount of fill material used in such plastic forming mixture.

Various qualities of polyethylene final plastic products are also improved by the use of the aqueous plastic modifying compositions in the preparation of polyethylene plastic forming mixtures as taught herein. The resulting polyethylene plastic forming mixtures provide final plastic products such as, for example and without limitation, polyethylene plastic films having substantially higher tensile strength than traditionally prepared films. For example, such resulting plastic films can be used to replace traditional 2-ply plastic trash bags having a mesh material sealed between the two plies to provide the required strength with a single ply trash bag. In addition, use of such resulting polyethylene plastic forming mixtures to form 1-ply polyethylene plastic films also reduces or eliminates the need to include a perfume used to mask odors emanating from the contents of such films or bags. Accordingly, the present invention further provides a method of forming 1-ply polyethylene plastic films having tensile strength equivalent to or greater than traditional 2-ply polyethylene films and, alternatively or in addition to greater tensile strength, reducing or eliminating the need for the use of perfumes to minimize or eliminate odors emanating from contents of such films, including without limitation, polyethylene trash bags, comprising formation of polyethylene plastic film via the addition of an aqueous plastic modifying agent of the present invention to a polyethylene plastic forming mixture wherein an aqueous plastic modifying composition is added to a polyethylene substrate plastic forming material at a concentration of from about 2.5 thousand ppm to about 3.5 thousand ppm relative to the amount of fill material used in such plastic forming mixture. However, the use of the aqueous plastic modifying agent/composition can be used at higher concentrations as taught herein. Accordingly, the concentration of the aqueous plastic modifying composition should be used at a concentration of at least about 2,500 ppm.

Similarly, use of an aqueous plastic modifying composition in the preparation of polystyrene plastic forming mixtures and formation of resulting polystyrene final plastic products increases the amount of fill material that can be used resulting in the reduction of brittleness of such polystyrene final plastic products compared to the brittleness of traditionally prepared polystyrene final plastic products. Accordingly, the present invention further provides a method to reduce the brittleness of polystyrene plastic final products compared to traditionally prepared polystyrene final plastic products via increased use of fill material comprising formation of polystyrene final plastic products via the addition of an aqueous plastic modifying agent of the present invention to a polystyrene plastic forming mixture wherein an aqueous plastic modifying composition is added to a polystyrene substrate plastic forming material at a concentration of from about 2.5 thousand ppm to about 3.5 thousand ppm relative to the amount of fill material used in such plastic forming mixture. However, the use of the aqueous plastic modifying agent/composition can be used at higher concentrations as taught herein. Accordingly, the concentration of the aqueous plastic modifying composition should be used at a concentration of at least about 2,500 ppm.

For the recycling of plastic final products, particularly polypropylene plastic final products, recycled material typically require the addition of virgin plastic forming mixture derived from non-recycled plastic substrate, and such recycling typically is limited to one or two recycling processes before the final plastic products can no longer be used for recycling due to loss of integrity of required plastic characteristics. The addition of aqueous plastic modifying compositions of the present invention in the formation of final plastic products made from polyethylene, polypropylene and/or polystyrene as taught herein improve the recyclability of such final plastic products, up to four times, without the addition of virgin plastic forming mixture. Accordingly, the present invention also provides a method of making recyclable final plastic products that can be recycled without the use of virgin plastic substrate comprising the use of the preparations of a plastic forming mixture according to the teachings herein.

Similarly, a method for extending the recycling life of plastic final products made from polyethylene, polypropylene and/or polystyrene as taught herein, such recycling as accomplished up to four times without the addition of virgin plastic substrate comprising the use of the preparations of a plastic forming mixture according to the teachings herein.

In addition to the cost of plastic substrate, plastic forming cycle times (preparation of a plastic substrate through injection for molding) can increase the cost of production of final plastic products. As such, a reduction in such cycle times can increase production and decrease per item costs. Even marginal cost savings on a per piece basis can provide substantial savings over time. The use of aqueous plastic modifying agents in the preparations of plastic forming mixtures according to the teachings herein can reduce plastic forming cycle times by an amount selected from the group consisting of 10%, 15%, 20%, 25%, 30% and 35% compared to cycle times typical of plastic forming processes conducted in the absence of aqueous plastic modifying compositions taught herein. In other words, use of the present aqueous plastic modifying compositions can reduce plastic forming cycle times by at least 10% compared to cycle times typical of plastic forming processes conducted in the absence of aqueous plastic modifying compositions taught herein.

The afore-incorporated chapters from *Ulmann's Encyclopedia of Industrial Chemicals* provide the basis of present formulae and processes for the formation of polyethylene, polypropylene and polystyrene final plastic products and form the basis of comparison of such formulae and process compared to the compositions, formulae and processes taught herein relative to the use of aqueous plastic modifying composition used in plastic forming mixtures and final plastic products as taught herein.

Another aspect of the present invention provides enhanced carbonate compositions comprising at least one carbonate and at least one aqueous carbonate enhancing composition.

Calcium carbonates are used in a multitude of industrial applications, but is also known to have limitations in such uses, including without limitation, impurities, flow rates, maximum calcium carbonate loading and the like when used in each of such industrial applications. These issues are also potentially restrictive with industrial uses of other mineral carbonates such as magnesium carbonates, sodium carbonates, potassium carbonates, lithium carbonates, rubidium carbonates, cesium carbonates, beryllium carbonates, strontium carbonates, barium carbonates, aluminum carbonates, tallium carbonates, lead carbonates and the like, with commonly used in carbonates in industrial applications being calcium carbonates, magnesium carbonates, sodium carbonates and potassium carbonates. For the majority of such carbonates, industrial preparations vary between carbonates and within any one mineral carbonate form. The carbonates mentioned in this paragraph are herein individually referred to as a "carbonate" and collectively, as "carbonates". More generally, the most common main group elements used as carbonates are the alkali and alkaline carbonates, in addition to organic carbonate compounds generally known in the art.

The following represents non-limiting examples of the uses of the various carbonates listed herein:

Calcium carbonates have a myriad of uses including, without limitation: animal feed and nutrition, adhesives, caulks, agriculture products, carpet backing, concrete, drilling fluids, environmental remediation, joint compounds, paints and coatings, paper pulp and papermaking, rock dust, rubber, thermoset composites, thermoplastics, cultured marble, cast polymers, flooring, powder coatings and cleansers and polishes. The present carbonate enhancing compositions, including aqueous carbonate enhancing compositions throughout these carbonate representations, are useful in calcium carbonate applications where, without limitation, enhancement of the activity, load, solubility, reduction of impurities and/or specific attributes of products in which calcium carbonate is used are necessary or useful, each as the case may be. Exemplary and non-limiting uses of calcium carbonate with carbonate enhancing compositions of the present invention are further set forth herein.

Lithium carbonates are used in, for example, drug development. When used with the carbonate enhancing compositions of the present invention, lithium solubility and heat stability may be increased.

Sodium carbonates are frequently used in, for example, glass making, pulp and paper industry, sodium chemicals (silicates), soap and detergent production, the paper industry and water softener. Addition of carbonate enhancing compositions which, throughout this specification, can include aqueous carbonate enhancing compositions of the present invention to sodium carbonate may improve the overall performance of the intended use of sodium carbonate including, for example and without limitation, increase in the percent use of sodium carbonate loading compared to its traditional percent of a final composition, fill percentage, solubility of the sodium, sprayability when used for coatings, and the like, each as the case may be.

Potassium carbonates are frequently used in, for example, glass making, soft soap production, textile and photography chemicals. Addition of carbonate enhancing compositions of the present invention to potassium carbonate may improve the overall performance of the intended use of potassium carbonate including, for example and without limitation, increase in the percent use of potassium carbonate loading compared to its traditional percent of a final composition, fill percentage and solubility of the potassium, each as the case may be.

Rubidium carbonates are frequently used in, for example, glass making and short-chain alcohol production. Addition of carbonate enhancing compositions of the present invention to rubidium carbonate may improve the overall performance of the intended use of rubidium carbonate including, for example and without limitation, increase in the percent use of rubidium carbonate loading compared to its traditional percent of a final composition, and solubility and maintenance of the rubidium in solution, each as the case may be.

Cesium carbonate is primarily used, for example, for the production of other cesium salts. Addition of carbonate enhancing compositions of the present invention to cesium carbonate may improve the overall performance of the intended use of cesium carbonate including, for example and without limitation, increase in the percent use of cesium carbonate loading compared to its traditional percent of a final composition, and solubility and maintenance of the cesium in solution, each as the case may be.

Because beryllium carbonates are insoluble in water, the addition of carbonate enhancing compositions of the present invention to beryllium carbonate may improve the solubility of beryllium carbonate, increasing the usefulness of beryllium.

Magnesium carbonates are primarily used, for example, in skin care products, cosmetic, anti-fire products, climbing chalk. Addition of carbonate enhancing compositions of the present invention to magnesium carbonate may improve the overall performance of the intended use of magnesium carbonate including, for example and without limitation, increase in the percent use of magnesium carbonate loading compared to its traditional percent of a final composition, and solubility and maintenance of the magnesium in solution, each as the case may be.

Silver carbonates are primarily used, for example, for a variety of chemical reactions, in microelectronics and in dermally applied pharmaceutics. Addition of carbonate enhancing compositions of the present invention to silver carbonate may improve the overall performance of the intended use of silver carbonate including, for example and without limitation, increase in the percent use of silver carbonate loading compared to its traditional percent of a final composition, and solubility and maintenance of the silver in solution, each as the case may be.

Strontium carbonates are primarily used, for example, in fireworks, magnets and fireworks manufacture. Addition of carbonate enhancing compositions of the present invention to strontium carbonate may improve the overall performance of the intended use of strontium carbonate including, for example and without limitation, increase in the percent use of strontium carbonate loading compared to its traditional percent of a final composition, and solubility and maintenance of the strontium in solution, each as the case may be.

Barium carbonates are primarily used, for example, in glass, cement, ceramic, porcelain and rat poison manufacturer. Addition of carbonate enhancing compositions of the present invention to barium carbonate may improve the overall performance of the intended use of barium carbonate including, for example and without limitation, increase in the percent use of barium carbonate loading compared to its traditional percent of a final composition, and solubility and maintenance of the barium in solution, each as the case may be.

Aluminum carbonates are primarily used, for example, in drug development. Addition of carbonate enhancing compositions of the present invention to aluminum carbonate may improve the overall performance of the intended use of aluminum carbonate including, for example and without limitation, increase in the percent use of aluminum carbonate loading compared to its traditional percent of a final composition, and solubility and maintenance of the aluminum in solution, each as the case may be.

Tallium carbonates are primarily used, for example, for fungicide development. Addition of carbonate enhancing compositions of the present invention to tallium carbonate may improve the overall performance of the intended use of tallium carbonate including, for example and without limitation, increase in the percent use of tallium carbonate loading compared to its traditional percent of a final composition, and solubility and maintenance of the tallium in solution, each as the case may be.

Lead carbonates are primarily used, for example, glass, cement, ceramic, porcelain, and rat poison manufacturer. Addition of carbonate enhancing compositions of the present invention to lead carbonate may improve the overall performance of the intended use of lead carbonate including, for example and without limitation, increase in the percent use of lead carbonate loading compared to its traditional percent of a final composition, and solubility and maintenance of the lead in solution, each as the case may be.

Accordingly, one aspect of the present invention provides a carbonate enhanced composition comprising at least one carbonate and at least one carbonate enhancing composition. Such carbonates may be any of those taught herein, and such carbonate enhancing composition may be any carbonate enhancing composition as set forth herein, which may or may not be aqueous, and which further may or may not be free or substantially free of solids.

One use and another aspect of the present disclosure include the use of at least one carbonate enhancing composition or at least one enhanced carbonate composition wherein such carbonate includes calcium carbonate and sodium carbonate in the manufacture of glass, particularly soda-lime glass. Generally, soda-lime glass is comprised of about 60% to about 75% silica, about 12% to about 15% sodium carbonate about 5% to about 12% calcium carbonate. This non-limiting example represents a single composition for making glass among the myriad of compositions used to make and color a variety of glass products. Accordingly, the use of at least carbonate enhancing composition or at least one carbonate enhanced composition can be used with such myriad of glass making compositions including the use of calcium carbonate, sodium carbonate and/or potassium carbonate.

Another use and aspect of the present disclosure include the use of at least one carbonate enhanced composition, particularly enhanced calcium carbonate, in the preparation and manufacture of paper pulp (having various origins including without limitation, softwood trees, hardwood trees and other cellulosic-based materials), paper, including pulp processing and finished paper-based products including, without limitation, fine paper, paper, cardboard and the like and paper coatings, generally sprayed-on coatings. For paper pulp, at least one carbonate enhanced composition, typically using calcium carbonate, is used as a causticizing agent in the pulp sulfate process, to prepare calcium bisulfate in the pulp sulfite process, used with chlorine in the bleaching process, in the treatment of pulp and paper mill waste treatment, a filtration conditioner, a neutralizing agent and to recover alcohol, calcium lignosulfonate and yeast. In the paper making process, including all paper-based products, calcium carbonate, with at least one aqueous carbonate enhancing composition of the present invention, has multiple uses including, without limitation, as a filler, for paper coatings, to increase paper tensile strength, increase machine speed and productivity, improve print quality, improve water drainage, improve machine runability, increase opacity and brightness, improve cost-effectiveness of papermaking process and reduce fiber consumption. The calcium carbonate used in these processes and other processes taught herein can be ground or precipitate calcium carbonate, each having its attributes that are well known to the skilled artisan. Typically, calcium carbonate is limited to the alkaline paper-making process. It is believed, however, that the use of calcium carbonate may be extended to the acid papermaking and wood-containing paper when used with at least one carbonate enhanced composition of the present invention. Generally, and without limitation, the at least one carbonate enhanced composition of the present invention is added during either the precipitation process or the grinding process used for the preparation of the respective calcium carbonate, at the concentrations further taught herein. The calcium carbonate containing the at least one aqueous carbonate enhancing composition can be used in each of the calcium carbonate uses enumerated herein, or otherwise, in the preparation of paper pulp and/or papermaking processes.

Calcium carbonate, particularly ground calcium carbonate is used in various paint and coating applications as, for example and without limitation, an agent to either enhance or reduce gloss, an extender/spacer for titanium dioxide, a rheology modifier and as a paint and coating additive to densify the product. The addition of at least one carbonate enhanced composition of the present invention in the preparation of such paintings and coatings, when used according to the teachings herein, can enhance the desired properties of the respective paint and coating products, particularly, without limitation, rheological attributes, density and white color brightening. Similar properties can be provided to adhesives, joint compound/drywall mud and/or sealants. Similar use of the present enhanced carbonate compositions, primarily with the use of ground calcium carbonate, can be used as an extender, a detackifying agent, to provide stiffness and/or abrasion resistance to and for rubber and rubber applications. Additionally, use of the present enhanced carbonate compositions with calcium carbonate, primarily ground calcium carbonate, can be used in thermoset applications as, for example and without limitation, as an extender in fiberglass reinforced polyester applications for sheet molding and bulk molding compounds, for viscosity control, flow control and fill, to limit shrinkage and as a coefficient to control thermal expansion. Moreover, use of the present enhanced carbonate compositions with calcium carbonate, primarily ground calcium carbonate, can be used in vinyl flooring applications as a weighting agent, whiting agent, a cost-reducer and/or as a stiffener. Use of the present enhanced carbonate compositions with calcium carbonate, primarily ground calcium carbonate, can also be used in cultured marble applications providing a number of benefits including, for example and without limitation, improved wet out properties, loading properties, particle packing and packing properties, thermal shock properties, low black spec levels and/or low free moisture. Additionally, use of the present enhanced carbonate compositions with calcium carbonate, primarily ground calcium carbonate, can be used in water- and/or oil-based drilling fluids and recirculation fluids that can provide improved attributes such as, for example and without limitation, improved solubility in acid, increased viscosity, reduced water demand and/or increased bulk density (loose and compacted) and the like.

Accordingly, aspects of the present invention include the various methods of using the enhanced carbonate compositions of the present inventions, without limitations, in the various methods described herein with each such carbonate (s). Accordingly, another aspect of the present invention provides a method of using at least one carbonate enhanced composition comprising the addition of at least one carbonate enhanced composition to the other components used in the formation and/or manufacture of a product using a carbonate in its preparation and/or composition.

More specifically, one aspect of the present invention provides a carbonate enhanced composition comprising calcium carbonate and at least one carbonate enhancing composition. Also provided is a method of using at least one carbonate enhanced composition in the preparations of at least one product consisting of the group consisting of animal feed and nutrition, adhesives, caulks and sealants, agriculture products, carpet backing, concrete, drilling fluids and recirculation fluids, environmental remediation, fiberglass reinforced polyester applications, glass, joint compounds, paints and coatings, paper, plastics, pulp and papermaking, rock dust, rubber, thermoset composites, thermoplastics, cultured marble, cast polymers, flooring, powder coatings and cleansers and polishes. A further aspect of the present invention provides a method of using at least one carbonate enhanced composition in the preparations of at least one product consisting of the group consisting of plastics, pulp, paper and paper coatings, paint and coatings and glass.

An additional aspect of the present invention provides a carbonate enhanced composition comprising sodium carbonate and at least one aqueous carbonate enhancing composition. Also provided is a method of using at least one such carbonate enhanced composition in the preparations of at least one product using sodium carbonate in its composition.

A further aspect of the present invention provides a carbonate enhanced composition comprising potassium carbonate and at least one aqueous carbonate enhancing composition. Also provided is a method of using at least one such carbonate enhanced composition in the preparations of at least one product using potassium carbonate in its composition.

A further aspect of the present invention provides a carbonate enhanced composition comprising silver carbonate and at least one aqueous carbonate enhancing composition. Also provided is a method of using at least one such carbonate enhanced composition in the preparations of at least one product using silver carbonate in its composition.

An additional aspect of the present invention provides a carbonate enhanced composition comprising at least one organic compound carbonate and at least one aqueous carbonate enhancing composition. Also provided is a method of using a composition comprising at least one organic compound carbonate and at least one carbonate enhanced composition in the preparations of at least one product using at least one organic compound carbonate in its composition.

As would be recognized by the ordinarily skilled artisan, all main group carbonates, except sodium, potassium, rubidium and cesium, are unstable to heat and insoluble in water. The aqueous carbonate enhancing compositions of the present invention are intended to enhance the solubility of all carbonates, making the respective metal ions more soluble and/or available for use in final or intermediate preparations and/or manufacture. Use of the present aqueous carbonate enhancing compositions may also impart improved heat stability as has been observed with the use of such compositions with calcium carbonate in the preparation of plastics, particularly injection molded plastics. Furthermore, the ordinarily skilled artisan would recognize that the toxicity of such present compositions would be related to the toxicity of the alkali or alkaline metal carbonates or carbonate compounds to which the present compositions are added.

For enhanced carbonate compositions of the present invention, ground, precipitated and/or nano calcium carbonate can be used for the preparation of such compositions. To the desired amount of calcium carbonate is added from about 2,500 ppm to about two percent (20,000 ppm) of at least one aqueous carbonate enhancing composition. More specifically, the at least one carbonate enhancing composition is added to calcium carbonate at concentrations including, without limitation, about 2,500 ppm, 3,500 ppm, 4,000 ppm, 5,000 ppm, 6,000 ppm, 7,000 ppm, 7,500 ppm, 8,000 ppm, 9,000 ppm, 10,000 ppm, 11,000 ppm, 12,000 ppm, 13,000 ppm, 14,000 ppm, 15,000 ppm, 16,000 ppm, 17,000 ppm, 18,000 ppm, 19,000 ppm and 20,000 ppm. The amount of such carbonate enhancing composition used in preparing such enhanced carbonate compositions will vary by the need and application thereof.

The enhanced carbonate compositions comprising calcium carbonate and at least one aqueous plastic modifying composition can be prepared via dry or wet blending after calcium carbonate is prepared. For best results, the at least one aqueous plastic modifying composition is wet blended, using an appropriated means, with calcium carbonate during the calcium carbonate grinding process. Alternatively, the at least one aqueous plastic modifying composition can be added to the calcium carbonate during the calcium carbonate precipitation process. Each of the grinding and precipitation calcium carbonate processes are well know in the art. The present methods for preparing enhanced carbonate compositions using calcium carbonate can be used to prepare like compositions using other carbonates, particularly alkali and alkaline metal carbonates, as the case may be.

The copper sulfate element of the present carbonate enhancing compositions, including the aqueous plastic modifying compositions, and enhanced carbonate compositions, generally can impart antibacterial, anti-mold and anti-fungal properties in intermediate or final products in which such compositions are used. For example and without limitation, when the present compositions are used in the preparation of plastic products, plastics used in, including, for example and without limitation, food preparation, packaging, serving and delivery, in pipes and drains, for medical applications, for oral hygiene products, and a myriad of other applications that can benefit from plastics using calcium carbonate in the preparation thereof. In addition, use of such carbonate enhancing compositions with calcium carbonate in the preparation of plastics can also inhibit and potentially prevent discoloration of intermediate and/or final products due to bacterial, mold and/or fungal activity. Such use of the present compositions with calcium carbonate in the manufacture of plastics may reduce or eliminate the need to use other antibacterial, anti-mold and/or anti-fungal additives. Of these, typically, antibacterial activity is most desirable. Where applicable, silver carbonate can be substituted for or added with calcium carbonate in the preparation of a respective enhanced carbonate composition, wherein such composition can also impart antimicrobial, anti-mold and/or anti-fungal properties in the intermediate and/or final products in which such compositions are used. In addition, silver sulfate and be used in substitution of, or addition to the copper sulfate element in the preparation of the present carbonate enhancing compositions to further impart such antimicrobial properties to such intermediate and/or final products in which such carbonate enhancing composition is used.

Similarly, when the present compositions are used with at least one carbonate enhancing composition comprising copper and/or silver sulfate in the preparation of paints, calks, joint compound/drywall mud and/or sealants, and the like products, such compositions can also impart antibacterial, anti-mold, anti-fungal and anti-discoloration properties is such, without limitation, products. Of these, typically, antibacterial activity is most desirable.

Likewise, when the present enhanced carbonate compositions comprising copper and/or silver sulfate are used with calcium carbonate in the preparation of paper pulp, paper, cardboard, paper and cardboard coatings and the like products, in addition to improving tensile strength of such paper and/or cardboard products, such compositions can also impart antibacterial, anti-mold, anti-fungal and anti discoloration properties in such, without limitation, products. Of these, typically, antibacterial activity is most desirable. For example, antibacterial paper and cardboard products and coating used on such paper and/or cardboard products are highly desirous when used in hospital, school, food service and other hygiene-conscious applications. For the sake of clarity, the use of compositions of the present invention are not limited to the use of the terms "paper" and/or "cardboard", but are intended to be useful for any and all products made from paper as would be recognized by the ordinarily skilled artisan.

Another aspect of the present invention provides an antimicrobial composition comprising at least one composition selected from the group consisting of at least one carbonate enhanced composition and at least one carbonate enhancing composition wherein each composition comprises copper and/or silver sulfate, and wherein the carbonate enhancing composition is optionally aqueous. In such composition(s), the carbonate is selected from the group consisting of at least one alkali and at least one alkaline metal carbonate. In such compositions, the at least one alkali and alkaline metal carbonate is selected from the group consisting of any carbonate, particularly from calcium carbonate, sodium carbonate and potassium carbonate. Such compositions can be used alone or in combination with other carbonates.

Another aspect of the present invention provides a method of inhibiting microbial growth in a product comprising, at least in part, at least one composition selected from the group consisting of at least one carbonate enhanced composition and at least one carbonate enhancing composition wherein each composition comprises copper and/or silver sulfate, and wherein the carbonate enhancing composition is optionally aqueous. In such composition(s), the carbonate is selected from the group consisting of at least one alkali and at least one alkaline metal carbonate. In such compositions, the at least one alkali and alkaline metal carbonate is further selected from the group consisting of calcium carbonate, sodium carbonate and potassium carbonate. Such compositions can be used alone or in combination with each of calcium carbonate, sodium carbonate and/or potassium carbonate. Using this method, antimicrobial inhibition can be each of, or a combination of, antibacterial, anti-mold and/or anti-fungal inhibition.

Although specific embodiments have been described above, these embodiments are not intended to limit the scope of the present disclosure, even where only a single embodiment is described with respect to a particular feature. Examples of features provided in this disclosure are intended to be illustrative rather than restrictive unless stated otherwise. The present disclosure is intended to cover such alternatives, modifications and/or equivalents as would be apparent to a person skilled in the art having the benefit of this disclosure.

It is to be understood that the present compositions are limited only to the ranges and or limitation set forth herein and not to variations within such ranges. It is also to be understood that the terminology used herein is for the purpose of describing particular embodiments only, and is not intended to be limiting.

Further modifications and alternative embodiments of various aspects of the embodiments described in this disclosure will be apparent to the skilled artisan in view of the present disclosure. Elements and materials may be substituted for those illustrated and described herein, parts and processes may be reversed and certain features of the embodiments may be utilized independently, all as would be apparent to one skilled in the art after having the benefit of the description. Changes may be made in the elements described herein without departing from the spirit and scope of the appended claims.

EXAMPLES

Example 1

Preparation of an ammonium sulfate stock solution for a solubility enhancing aqueous composition: Into a volumetrically calibrated common 250 mL beaker, 90 mL of deionized $H_2O$ was added. 20 grams of $(NH_4)_2SO_4$ was completely dissolved into the deionized water. The total volume was brought to 100 mL using additional deionized water. 20 grams $(NH_4)_2SO_4$ per 100 mL $H_2O$ is a 20% solution and is a 1.51 M solution.

Example 2

Direct preparation of a second solution for the preparation of a solubility enhancing aqueous composition without the prior preparation of a first solution wherein the ratio of a first solution equivalent to water addition in this step is four parts water to one part first solution equivalent:
- 1.15 mL of 20% $(NH_4)_2SO_4$ was added to a common 10 mL polypropylene centrifuge tube
- 8.0 mL deionized water added to tube
- 0.850 mL of concentrated (95-98%) sulfuric acid ($H_2SO_4$) added to tube with sufficient force to mix

Example 3

Direct preparation of a second solution for a solubility enhancing aqueous composition without the prior preparation of a first solution wherein the ratio of a first solution equivalent to water addition in this step is nine parts water to one part first solution equivalent:
- 0.576 mL of 20% $(NH_4)_2SO_4$ was added to a common 10 mL polypropylene centrifuge tube
- 9.0 mL deionized water added to tube
- 0.424 mL of concentrated (95-98%) sulfuric acid ($H_2SO_4$) added to tube with sufficient force to mix

Example 4

Direct preparation of a second solution for a solubility enhancing aqueous composition without the prior preparation of a first solution wherein the ratio of a first solution equivalent to water addition in this step is nineteen parts water to one part first solution equivalent:
- 0.288 mL of 20% $(NH_4)_2SO_4$ was added to a common 10 mL polypropylene centrifuge tube
- 9.5 mL deionized water added to tube
- 0.212 mL of concentrated (95-98%) sulfuric acid ($H_2SO_4$) added to tube with sufficient force to mix

Example 5

Preparation of solubility enhancing aqueous composition samples for liquid chromatography—mass spectrometry (LC-MS) analysis: Each of Examples 2, 3 and 4, following addition of the sulfuric acid:
- the centrifugation tubes were briefly capped and vortexed to mix thoroughly
- caps were loosened to vent. It was observed that the temperatures of the centrifugation tubes were greater than ambient temperature. Such temperature was not sufficient to melt the centrifugation tubes.
- reactions were allowed to run for about 60 minutes
- after completion of the reaction time, 1 mL samples of the reacted solutions were filtered through a 0.44 micro Pall syringe filter and placed into labeled mass spectrometry vials
- vials were loaded into a Thermo Q Exactive Plus MS system with a Vanquish LC front end
- LC Settings:
- 0.25 ml/min
- 40% methanol/60% water/0.1% formic acid
- column temp 30☐
- Thermo Accucore AQ C18 polar end cap column (150 mm×3 mm)
- Injection volumes of 20 uL
- Low Resolution Parameters
- Full MS-SIM
- 0-10 minutes
- Positive polarity
- Resolution: 70,000
- AGC Target: $3\times10^6$
- Max IT: 200 ms
- Scan Range: 50-700 mz
- High Resolution Parameters
- Full MS/dd-MS$^2$
- 0-7 minutes
- Positive polarity
- Full MS: Resolution: 70,500
- AGC Target: $3\times10^6$
- Max IT: 100 ms
- Scan range: 50-700 mz
- dd-MS$^2$: Resolution: 17,500
- AGC target: $2\times10^6$
- Max IT: 50 ms
- Scan range: 50-700 mz
- Minimum AGC Target: $2\times10^3$

Example 6

Laboratory Preparations of First Solutions for preparation of solubility enhancing aqueous compositions for Ion Chromatographic Quantification:
- A 24% solution of ammonium sulfate was created by adding 96 grams of ammonium sulfate to 400 grams deionized water. The solution was mixed to completely dissolve the ammonium sulfate.
- Ten (10) identical 20 mL reactions were produced:
  - 9.6 mL of the preceding 24% ammonium sulfate solution was added to individually labeled common 50 mL conical tubes by way of calibrated macropipette
  - 10.4 mL of concentrated sulfuric acid (95-98% reagent grade) was added to each tube by way of calibrated micropipette with sufficient force to thoroughly mix
  - Tubes were allowed to stand loosely capped for an hour for reaction to run to completion.

Example 7

Ion Chromatography (IC) Method.
Samples from Example 6 were transferred to IC vials, diluted appropriately (1:2500) to bring the ionic concentrations into the range of testing equipment used, and ion chromatography was undertaken using the following parameters:

Ion Chromatography:
Dual Thermo Dionex Aquion
Anion Side:
Column: Dionex IonPac AS22 RFIC 4×250 mm
Mobile phase: carbonate/bicarbonate buffet at 4.8/1.2 mM
Flow: 1.2 mL/min isocratic
Suppressor: Dionex ADRS 600 4 mm
Sup. Voltage: 33 mA
Standard: IC STD for sulfate, 50-500 ppm
Anion cell: 35° C.
Anion column: 30° C.
18 minute run time
Cation Side:
Column: Dionex IonPac CS16 RFIC 5×250 mm
Mobile phase: 30 mM MSA solution
Flow: 1 mL/min isocratic
Suppressor: Dionex CDRS 600 4 mm
Sup voltage: 89 mA
Standard: IC STD for ammonium 20-100 ppm
Cation cell: 40° C.
Cation column: 35° C.
18 minute run time
All 25 uL injections Example 8

Ion Chromatography Results.
Using the sample preparations set forth in Example 6 and the ion chromatography methods set forth in Example 7, the following results (10 samples; 2 replicates) were obtained:

| Sulfate mol/L | Ammonium mol/L |
| --- | --- |
| 9.1904799 | 1.6264427 |
| 8.00-13.00 | 1.45-2.01 |

Example 9

Commercial-scale Production of a Solubility Enhancing Composition First Solution Into a 500-gallon polyethylene conical-bottom tank was added 160.5 pounds (about 19.2 gallons) of deionized water. Upon addition of the water, a magnetic-driven shearing pump with an impeller was engaged, circulating the water in the tank. To the water was slowly added 50.7 pounds of pre-weighed ammonium sulfate (GAC Chemical Corp., Searsport Me., U.S.A.) to enable solubilization of the ammonium sulfate preparing a 31.6% ammonium sulfate solution. The recirculating pump was allowed to run for about 20 minutes for this batch size. Complete solubilization of the ammonium sulfate was visually confirmed by decanting about 250 mL of solution into a PET bottle that was allowed to stand undisturbed for about 15 minutes, confirming complete solubilization.

A 50-gallon Dietrich (Corpus Christi, Tex., U.S.A.) closed-loop, stainless steel-jacketed, glass-lined reactor was pre-cooled using a CTS T-230 cooling tower (Cooling Tower Systems, Macon, Ga. U.S.A.) circulating a mixture of municipal water and sufficient sodium hypochlorite to maintain a pH from about 7.5 to about 7.8. To this reactor was added 400.6 pounds (about 26.1 gallons) of 98% sulfuric acid (Brenntag; Henderson, Ky. U.S.A.) while a shaft-driven paddle mixer was engaged at 1700 rpm. To the sulfuric acid was rapidly added the ammonium sulfate solution and was mixed for about 20 minutes (until the reaction mixture cooled to a temperature of about 130 degrees Fahrenheit) at which time the reaction to form this first solution was complete.

Example 10

Commercial Production of a Solubility Enhancing Composition Second Solution

To a one thousand gallon polyethylene conical-bottom tank is added deionized water equal to the volume or mass of the first solution. To this water is added the first solution. The resulting mixture represents a second solution of the present invention.

Example 11

Ion Chromatography Results.
Using the sample preparations set forth in Example 9 and the ion chromatography methods set forth in Example 7, the following results (averages of 3 replicates of 3 samples) were obtained:

| Sulfate mol/L | Ammonium mol/L |
| --- | --- |
| 10.77769681 | 1.677964718 |

Target Ranges:

| Sulfate mol/L | Ammonium mol/L |
| --- | --- |
| 8.00-13.00 | 1.45-2.01 |

Example 12

Preparation of an Aqueous Plastic Modifying Composition (also used for the Preparation of an Aqueous Carbonate Enhancing Composition):

A 30% sodium hydroxide solution is prepared by dissolving 300 grams of sodium hydroxide per 1000 grams (1.0 L) of water;

A 50% Glucopon® 420 solution is prepared by dissolving 500 grams of Glucopon 420 per 1000 grams (1.0 L) of water;

To an appropriate mixing vessel is added 2700.98 grams of water;

To the water is added 551.60 grams of a first solution (as defined above) with slow mixing;

To the previous solution is added 276.91 grams of a 30% sodium hydroxide solution with slow mixing;

Mix the previous solution slowly for 30 minutes and, after which, adjust the pH to 3.0;

To the previous solution, slowly add 891.74 grams of copper sulfate with mixing until the copper sulfate is fully dissolved;

To the previous solution, add 5.80 grams of 50% Glucopon 420 and mix for 1 hour;

Adjust the final pH to 3.0 with sodium hydroxide.

Example 13

Commercial-scale Preparation (330 gallons of finished product) of an Aqueous Plastic Modifying Composition (also used for the Preparation of an Aqueous Carbonate Enhancing Composition):

To a 500 gallon polyethylene tank was added 2,116 pounds of 17 megohm water, with mixing via circulation from a roller pump;

To the water was added 183 pounds of a solubility enhancing aqueous composition, with continued mixing;

To the prior solution was slowly added 183 pounds of 50% sodium hydroxide, with continued mixing;

To the prior solution was added 590 pounds of copper sulfate, with continued mixing to maintain the copper sulfate in solution;

To the prior solution/suspension was added 2 pounds of Glucopon 420® with continued mixing for one hour pH of the final solution is adjusted to a pH from about 2.5 to about 3.5 using additional solubility enhancing aqueous composition in the pH needs to be lowered or add sodium hydroxide if the pH needs to be increased to the target range.

We claim:

1. A plastic forming mixture comprising:
   at least one plastic substrate;
   at least one calcium carbonate fill material; and
   an aqueous composition wherein the aqueous composition comprises:
      a solubility enhancing composition in solution comprising an anionic component consisting essentially of sulfate ions, alone or in combination with bisulfate ions, having a concentration from about 8.00 moles per liter to about 13.00 moles per liter of the solubility enhancing composition volume; a cationic component consisting essentially of ammonium ions having a concentration from about 1.45 moles per liter to about 2.01 moles per liter of the solubility enhancing composition volume; and hydrogen ions in a concentration from about 17.38 mols per liter to about 21.68 moles per liter of the solubility enhancing composition volume;
      a sodium hydroxide solution having as concentration of about 5 percent to about 7.5 percent volume/volume of the total aqueous phase volume of the aqueous composition;
      a sulfate selected from the group consisting of copper sulfate, silver sulfate and combinations thereof, said sulfate having a concentration from about 20 percent to about 26 percent mass/volume of the total aqueous phase volume of the aqueous composition;
      at least one surfactant selected from the group consisting of non-ionic surfactant, anionic surfactant, and combinations thereof having a concentration from 0.05 percent to about 0.15 percent volume/volume of the aqueous composition; and
      the addition of at least one acid or at least one base to adjust the pH of the aqueous composition to a pH from about 2.5 to about 3.5 at least one time during the preparation of the aqueous composition.

2. The plastic forming mixture of claim 1, wherein the at least one plastic substrate selected from the group consisting of polyethylene, polypropylene and polystyrene, and combinations thereof.

3. The plastic forming mixture of claim 1, wherein the fill material concentration is at least 2.5 percent volume/volume of the plastic forming mixture.

* * * * *